United States Patent
Kawahara et al.

(10) Patent No.: US 9,732,835 B2
(45) Date of Patent: Aug. 15, 2017

(54) LOCKUP DEVICE FOR TORQUE CONVERTER

(71) Applicant: EXEDY Corporation, Neyagawa-shi, Osaka (JP)

(72) Inventors: Yuki Kawahara, Neyagawa (JP); Hiroshi Uehara, Neyagawa (JP)

(73) Assignee: EXEDY CORPORATION, Neyagawa-shi, Osaka (JP)

( * ) Notice: Subject to any disclaimer, the term of this patent is extended or adjusted under 35 U.S.C. 154(b) by 0 days.

(21) Appl. No.: 14/903,597

(22) PCT Filed: Jul. 9, 2014

(86) PCT No.: PCT/JP2014/068292
§ 371 (c)(1),
(2) Date: Jan. 8, 2016

(87) PCT Pub. No.: WO2015/005379
PCT Pub. Date: Jan. 15, 2015

(65) Prior Publication Data
US 2016/0169358 A1    Jun. 16, 2016

(30) Foreign Application Priority Data
Jul. 11, 2013    (JP) .................................. 2013-145452

(51) Int. Cl.
*F16H 45/02* (2006.01)
*F16F 15/134* (2006.01)
(Continued)

(52) U.S. Cl.
CPC .......... *F16H 45/02* (2013.01); *F16F 15/129* (2013.01); *F16F 15/12353* (2013.01);
(Continued)

(58) Field of Classification Search
CPC ............. F16H 45/02; F16H 2045/0226; F16H 2045/0231; F16H 2045/0263; F16H 2045/0221
See application file for complete search history.

(56) References Cited

U.S. PATENT DOCUMENTS

| 5,020,647 A | 6/1991 | Fujimoto et al. |
| 2010/0096788 A1 | 4/2010 | Farahati |

(Continued)

FOREIGN PATENT DOCUMENTS

| CN | 1576627 A | 2/2005 |
| CN | 101487524 A | 7/2009 |

(Continued)

OTHER PUBLICATIONS

International Search Report for Int'l App. No. PCT/JP2014/068292, Oct. 7, 2014, 1-2.

(Continued)

*Primary Examiner* — Huan Le
(74) *Attorney, Agent, or Firm* — United IP Counselors, LLC (57) ABSTRACT

An output rotary member is coupled to a turbine and rotatable relatively to a clutch portion. First elastic members elastically and rotation-directionally couple the clutch portion and the output rotary member. A dynamic damper device is coupled to any of members forming a power transmission path from the clutch portion to the output rotary member and includes a damper plate having a plurality of circumferentially extending first openings and to be rotated together with the output rotary member. The dynamic damper device also includes inertia members disposed on both axial sides of the damper plate and rotatable relatively to the damper plate, each of the inertia members having circumferentially extending second openings located to oppose the first openings. The dynamic damper device
(Continued)

further includes second elastic members accommodated in the first openings and the second openings, the second elastic members elastically coupling the damper plate and the inertia members.

9 Claims, 9 Drawing Sheets

(51) Int. Cl.
  *F16F 15/123* (2006.01)
  *F16F 15/129* (2006.01)
  *F16F 15/14* (2006.01)
(52) U.S. Cl.
  CPC ........ *F16F 15/134* (2013.01); *F16F 15/1421* (2013.01); *F16H 2045/021* (2013.01); *F16H 2045/0226* (2013.01); *F16H 2045/0284* (2013.01)

(56) References Cited

U.S. PATENT DOCUMENTS

| | | | |
|---|---|---|---|
| 2010/0242466 A1* | 9/2010 | Krause | F16F 15/145 60/327 |
| 2010/0269497 A1 | 10/2010 | Engelmann et al. | |
| 2011/0031083 A1 | 2/2011 | Matsuoka et al. | |
| 2011/0099992 A1 | 5/2011 | Magerkurth et al. | |
| 2011/0287844 A1 | 11/2011 | Steinberger | |
| 2012/0080281 A1 | 4/2012 | Takikawa et al. | |
| 2012/0208648 A1 | 8/2012 | Takikawa et al. | |
| 2012/0217113 A1 | 8/2012 | Kawahara et al. | |
| 2013/0205944 A1 | 8/2013 | Sudau et al. | |
| 2013/0206529 A1 | 8/2013 | Tomiyama | |
| 2013/0225302 A1 | 8/2013 | Kawahara et al. | |
| 2016/0116020 A1 | 4/2016 | Tomiyama | |
| 2016/0116043 A1 | 4/2016 | Tomiyama | |
| 2016/0169358 A1 | 6/2016 | Kawahara et al. | |

FOREIGN PATENT DOCUMENTS

| | | |
|---|---|---|
| CN | 102597567 A | 7/2012 |
| CN | 102893055 B | 1/2013 |
| CN | 103189670 A | 7/2013 |
| DE | 102011101156 A1 | 11/2011 |
| DE | 112009005514 A | 10/2013 |
| JP | 62-185924 | 11/1987 |
| JP | H227238 Y2 | 7/1990 |
| JP | H05288239 A | 11/1993 |
| JP | H10169756 A | 6/1998 |
| JP | H11303940 A | 11/1999 |
| JP | 2001082577 A | 3/2001 |
| JP | 2001330105 A | 11/2001 |
| JP | 2002213567 A | 7/2002 |
| JP | 2005106112 A | 4/2005 |
| JP | 2008038951 A | 2/2008 |
| JP | 2009041662 A | 2/2009 |
| JP | 2009115112 A | 5/2009 |
| JP | 2009293671 A | 12/2009 |
| JP | 2011099488 A | 5/2011 |
| JP | 2011122621 A | 6/2011 |
| JP | 2011127686 A | 6/2011 |
| JP | 2011185382 A | 9/2011 |
| JP | 2012-506006 A | 3/2012 |
| JP | 4892630 B1 | 3/2012 |
| JP | 2012057694 A | 3/2012 |
| JP | 2012077826 A | 4/2012 |
| JP | 2012087856 A | 5/2012 |
| JP | 2012102817 A | 5/2012 |
| JP | 2012122584 A | 6/2012 |
| JP | 2012167755 A | 9/2012 |
| JP | 2012219999 A | 11/2012 |
| JP | 2012251649 A | 12/2012 |
| JP | 2013145025 A | 7/2013 |
| WO | WO2010043301 A1 | 4/2010 |
| WO | WO2011055622 A1 | 5/2011 |
| WO | WO2011138216 A1 | 11/2011 |
| WO | WO2012053280 A1 | 4/2012 |
| WO | WO2012063586 A1 | 5/2012 |
| WO | WO2012169243 A1 | 12/2012 |
| WO | WO2013161493 A1 | 10/2013 |

OTHER PUBLICATIONS

International Search Report for Int'l App. No. PCT/JP2014/063076, Aug. 19, 2014, 1-2.
International Search Report for Int'l App. No. PCT/JP2014/063082, Jul. 22, 2014, 1-2.
Office Action mailed on Dec. 15, 2016 for U.S. Appl. No. 14/894,344, filed Nov. 26, 2015, 23 pp.
Office Action mailed on Apr. 13, 2017 in U.S. Appl. No. 14/894,344, filed Nov. 26, 2015, 15 pp.
Office Action mailed on May 4, 2017 for Chinese Application No. 201480035524.2, 5 pp.
Office Action mailed on Apr. 24, 2017 for Chinese Application No. 201480030865.0, 7 pp.
Office Action mailed on Jun. 2, 2017 for Chinese Application No. 201480026934.0, 8 pp.

* cited by examiner

LOCKUP DEVICE FOR TORQUE CONVERTER

CROSS-REFERENCES TO RELATED APPLICATIONS

This application is the U.S. National Phase of PCT International Application No. PCT/JP2014/068292, filed on Jul. 9, 2014. That application claims priority to Japanese Patent Application No 2013-145452, filed Jul. 11, 2013. The contents of both applications are herein incorporated by reference in their entirety.

BACKGROUND

Technical Field

The present invention relates to a lock-up device, particularly to a lock-up device for a torque converter, which is disposed between a front cover coupled to an engine-side member and a torque converter body in order to directly transmit a torque from the front cover to a turbine of the torque converter body.

Background Art

A torque converter is embedded with a lock-up device in order to reduce fuel consumption. The lock-up device is disposed between a front cover and a turbine, and is configured to mechanically couple the front cover and the turbine in order to directly transmit a torque therebetween.

In general, the lock-up device includes a piston and a damper mechanism. The piston is pressed onto the front cover by the action of hydraulic pressure, and a torque is transmitted to the piston from the front cover. On the other hand, the damper mechanism includes a plurality of torsion springs, and the piston and an output-side member coupled to the turbine are elastically coupled by the plural torsion springs. In the lock-up device as described above, the torque transmitted to the piston is transmitted to the output-side member through the plural torsion springs, and is further transmitted to the turbine.

Incidentally, Japan Laid-open Patent Application Publication No. 2009-293671 describes a lock-up device that an inertia member is mounted to the output-side member in order to inhibit variation in engine rotational speed. In the lock-up device described in Japan Laid-open Patent Application Publication No. 2009-293671, the inertia member is mounted to the output member fixed to the turbine so as to be rotatable relatively thereto. Furthermore, torsion springs are mounted as elastic members between the output member and the inertia member.

In the lock-up device of Japan Laid-open Patent Application Publication No. 2009-293671, the inertia member is coupled to the output member through the torsion springs. Therefore, the inertia member and the torsion springs function as a dynamic damper, and these components attenuate variation in rotational speed of the output-side member (turbine).

SUMMARY

In the lock-up device of Japan Laid-open Patent Application Publication No. 2009-293671, the torsion springs, composing a part of the dynamic damper device, are disposed between the piston and the turbine, and as described above, an annular plate member is elastically coupled to the output member through the torsion springs. Furthermore, an inertia ring is fixed to the outer peripheral part of the annular plate.

The construction as described in Japan Laid-open Patent Application Publication No. 2009-293671 results in increase in axial space occupied by the dynamic damper device, and also results in complexity in shape of the inertia member.

It is an object of the present invention to provide a dynamic damper device that can especially realize a construction axially occupying a small space at a low cost.

Solution to Problems

A lock-up device for a torque converter according to a first aspect of the present invention is a device that is disposed between a front cover coupled to an engine-side member and a torque converter body and is configured to directly transmit a torque from the front cover to a turbine of the torque converter body. The lock-up device includes a clutch portion, an output rotary member, a plurality of first elastic members and a dynamic damper device. The clutch portion is configured to transmit the torque from the front cover to an output side. The output rotary member is coupled to the turbine and is rotatable relatively to the clutch portion. The plural first elastic members elastically and rotation-directionally couple the clutch portion and the output rotary member. The dynamic damper device is coupled to any of members forming a power transmission path from the clutch portion to the output rotary member, and is configured to attenuate variation in rotational speed. Additionally, the dynamic damper device includes a damper plate, a pair of inertia members and a plurality of second elastic members. The damper plate has a plurality of circumferentially extending first openings and is configured to be rotated together with the output rotary member. The pair of inertia members is disposed on both axial sides of the damper plate and is rotatable relatively to the damper plate, and each of the inertia members has circumferentially extending second openings located to oppose to the first openings. The plural second elastic members are accommodated in the first openings and the second openings, and elastically couple the damper plate and the pair of inertia members.

In the present device, when the clutch portion is turned into a clutch-on state (a power transmitted state), a power from the front cover is inputted to the plural first elastic members through the clutch portion, and is then transmitted from the plural first elastic members to the turbine through the output rotary member. At this time, the dynamic damper device is coupled to any of the members forming the power transmission path, and can inhibit variation in rotational speed.

Here, the pair of inertia members is mounted on the both axial sides of the damper plate, and the second elastic members are accommodated and disposed in the openings of the damper plate and those of the pair of inertia members. Hence, the space occupied by the dynamic damper device can be reduced smaller than that occupied by a well-known dynamic damper device. Especially, according to the construction of the present invention, the pair of inertia members can be formed by plate members, and manufacturing cost thereof can be reduced lower than inertia members formed by casting or forging.

A lock-up device for a torque converter according to a second aspect of the present invention relates to the device according to the first aspect, and further includes a pair of lid members, each of which is disposed axially outside each of the pair of inertia members so as to close the second openings.

Here, the lid members prevent the second elastic members from jumping out of the second openings of the pair of inertia members. In addition, the lid members function as members for increasing inertia as well.

A lock-up device for a torque converter according to a third aspect of the present invention relates to the device according to the second aspect, and wherein the damper plate has a plurality of circumferentially extending elongated holes located circumferentially between or among the plural first openings. Additionally, the lock-up device further includes a plurality of coupling members that axially pass through the elongated holes and couple the pair of inertia members and the pair of lid members.

Here, the coupling members, coupling the pair of inertia members and the pair of lid members, pass through the elongated holes of the damper plate. Therefore, the coupling members function as stoppers for restricting a relative rotational angular range between the damper plate and both of the inertia members and the lid members to a predetermined angular range.

A lock-up device for a torque converter according to a fourth aspect of the present invention relates to the device according to the third aspect, and wherein the first openings and the elongated holes of the damper plate are disposed on a common circle.

A lock-up device for a torque converter according to a fifth aspect of the present invention relates to the device according to any of the first to fourth aspects, and wherein each of the inertia members has an annular shape, and the damper plate has a spigot part that is contacted to one of inner peripheral surfaces of the inertia members so as to radially position the inertia members.

Here, the spigot part is formed on a part of the damper plate, and radially positions the inertia members.

A lock-up device for a torque converter according to a sixth aspect of the present invention relates to the device according to any of the first to fifth aspects, and wherein the dynamic damper device includes a hysteresis torque generating mechanism that is configured to generate a first hysteresis torque in a low rotational speed range and generate a second hysteresis torque larger than the first hysteresis torque in middle to high rotational speed ranges.

When the dynamic damper device includes the hysteresis torque generating mechanism, variation in rotational speed of the output rotary member exerts different characteristics in accordance with the magnitude of hysteresis torque.

Specifically, when the magnitude of hysteresis torque of the dynamic damper device is small, variation in rotational speed of the output rotary member gets small in the low rotational speed range. Contrarily, when the magnitude of hysteresis torque of the dynamic damper device is large, variation in rotational speed of the output rotary member gets small in the middle rotational speed range.

In view of the above, in the present invention, the hysteresis torque in the dynamic damper device is configured to be increased with increase in rotational speed. Therefore, even when a lock-up rotational speed is set to be low by attaching the dynamic damper device to the lock-up device, variation in rotational speed can be inhibited over wide rotational speed ranges.

A lock-up device for a torque converter according to a seventh aspect of the present invention relates to the device according to the sixth aspect, and wherein the hysteresis torque generating mechanism includes a slider and a contact member. The slider is configured to be rotated together with the inertia members, is radially movable with respect to the inertia members, and has a rotation-directionally extending slide surface. The contact member is configured to be rotated together with the damper plate, is configured to be contacted to the slide surface of the slider in the low rotational speed range so as to restrict a relative torsion angular range thereof with respect to the inertia members to a first angular range, is configured to be contacted to the slide surface of the slider in the middle rotational speed range including a rotational speed higher than a rotational speed in the low rotational speed range so as to restrict the relative torsion angular range thereof with respect to the inertia members to a second angular range narrower than the first angular range, and is configured to be contacted to the slide surface at the slider in the high rotational speed range including a rotational speed higher than the rotational speed in the middle rotational speed range so as to prevent relative torsional rotation thereof with respect to the inertia members.

A lock-up device for a torque converter according to an eighth aspect of the present invention relates to the device according to the seventh aspect, and wherein the slider has a lock part on a rotation-directional middle of the slide surface thereof so as to enable the contact member to be fitted thereto.

In the construction, when the rotational speed falls into the high rotational speed range and the relative torsion angular range between the contact member and the inertia members becomes narrow, the contact member is finally fitted to the lock part of the slider and thus relative rotation between the both is prevented. Put differently, the hysteresis torque becomes infinite.

A lock-up device for a torque converter according to a ninth aspect of the present invention relates to the device according to any of the first to eighth aspects, and further includes an intermediate member. The intermediate member is rotatable relatively to the clutch portion and the output rotary member, and causes at least two of the plural first elastic members to act in a series-like manner. Additionally, the damper plate is coupled to the intermediate member.

The lock-up device is herein constructed such that the damper plate of the dynamic damper device is coupled to the intermediate member, and the first elastic members are disposed between the dynamic damper device and the output rotary member. Therefore, even when a manufacturing error or so forth is produced in a member composing a part of the dynamic damper device, desired characteristics of absorbing variation in torque can be obtained, and variation in rotational speed can be effectively inhibited.

According to the present invention as described above, the lock-up device for a torque converter can especially realize a construction axially occupying a small space. Additionally, the inertia members can be formed by plate members, and can be reduced in manufacturing cost in comparison with those produced as casting products or forging products.

DETAILED DESCRIPTION OF EMBODIMENTS

Figure 1:
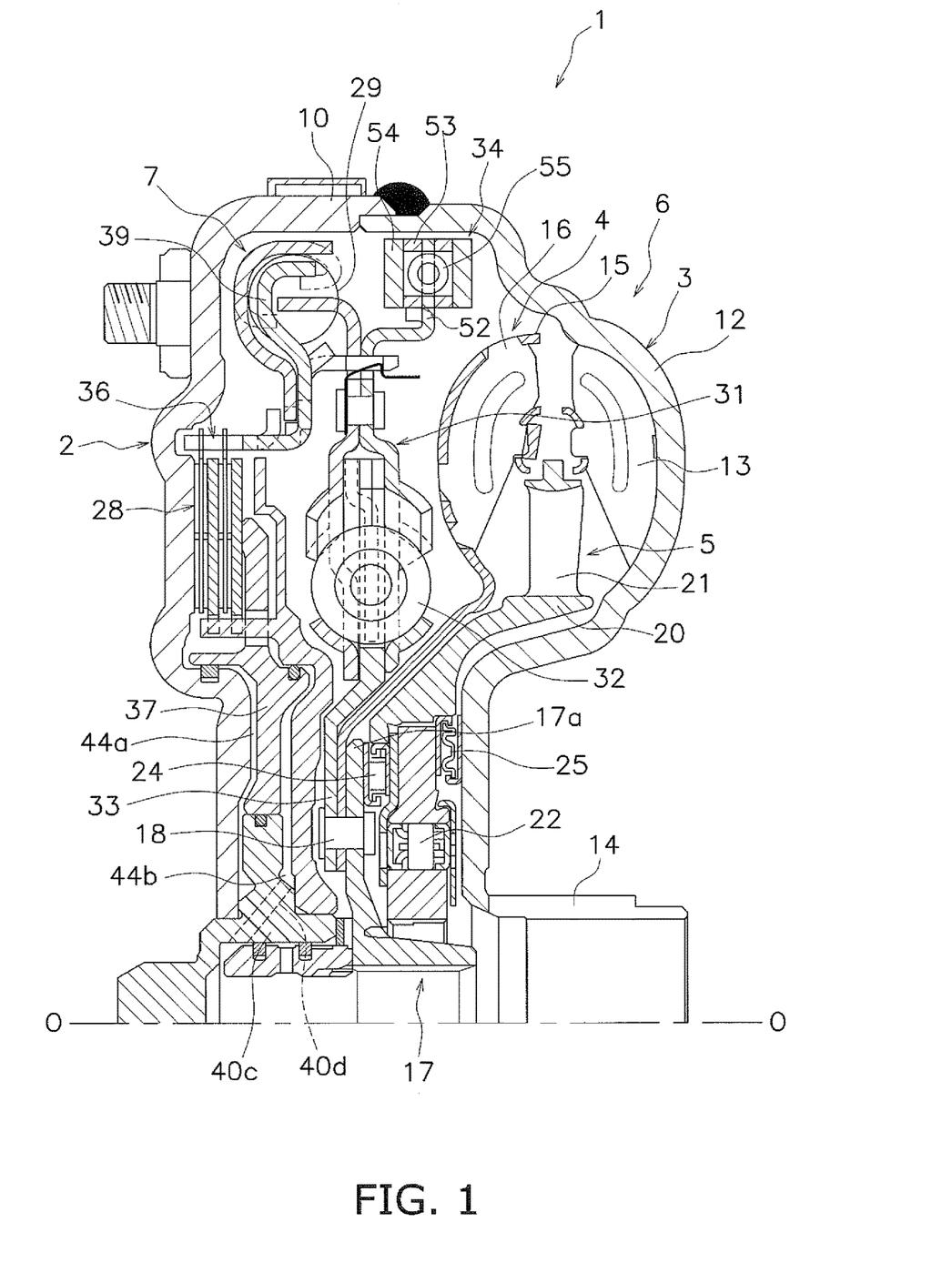
FIG. 1 is a cross-sectional view of a construction of a torque converter equipped with a lock-up device according to an exemplary embodiment of the present invention.

FIG. 1 is a partial cross-sectional view of a torque converter 1 equipped with a lock-up device according to an exemplary embodiment of the present invention. In FIG. 1, an engine (not shown in the drawing) is disposed on the left side, whereas a transmission (not shown in the drawing) is disposed on the right side. It should be noted that a line O-O depicted in FIG. 1 indicates a rotational axis of the torque converter and the lock-up device.

[Entire Construction of Torque Converter 1]

The torque converter 1 is a device for transmitting a torque from an engine-side crankshaft (not shown in the drawings) to an input shaft of the transmission, and includes a front cover 2 fixed to an input-side member, a torque converter body 6 composed of three types of vane wheels (an impeller 3, a turbine 4 and a stator 5), and a lock-up device 7.

The front cover 2 is a disc-shaped member, and an outer peripheral tubular part 10 is formed on the outer peripheral part of the front cover 2 so as to protrude toward the transmission. The impeller 3 is composed of an impeller shell 12 fixed to the outer peripheral tubular part 10 of the front cover 2 by welding, a plurality of impeller blades 13 fixed to the inside of the impeller shell 12, and a tubular impeller hub 14 disposed on the inner peripheral side of the impeller shell 12.

The turbine 4 is disposed within a fluid chamber so as to be opposed to the impeller 3. The turbine 4 is composed of a turbine shell 15, a plurality of turbine blades 16 fixed to the turbine shell 15, and a turbine hub 17 fixed to the inner peripheral part of the turbine shell 15. The turbine hub 17 has a flange 17a extending to the outer peripheral side, and the inner peripheral part of the turbine shell 15 is fixed to the flange 17a by a plurality of rivets 18. Furthermore, the input shaft of the transmission (not shown in the drawings) is spline-coupled to the inner peripheral part of the turbine hub 17.

The stator 5 is a mechanism for regulating the flow of operating oil returning from the turbine 4 to the impeller 3, and is disposed between the inner peripheral part of the impeller 3 and that of the turbine 4. The stator 5 is mainly composed of a stator carrier 20 and a plurality of stator blades 21 mounted to the outer peripheral surface of the stator carrier 20. The stator carrier 20 is supported by a stationary shaft (not shown in the drawings) through a one-way clutch 22. It should be noted that thrust bearings 24 and 25 are mounted on the both sides of the stator carrier 20 in the axial direction.

[Lock-up Device 7]

Figure 2:
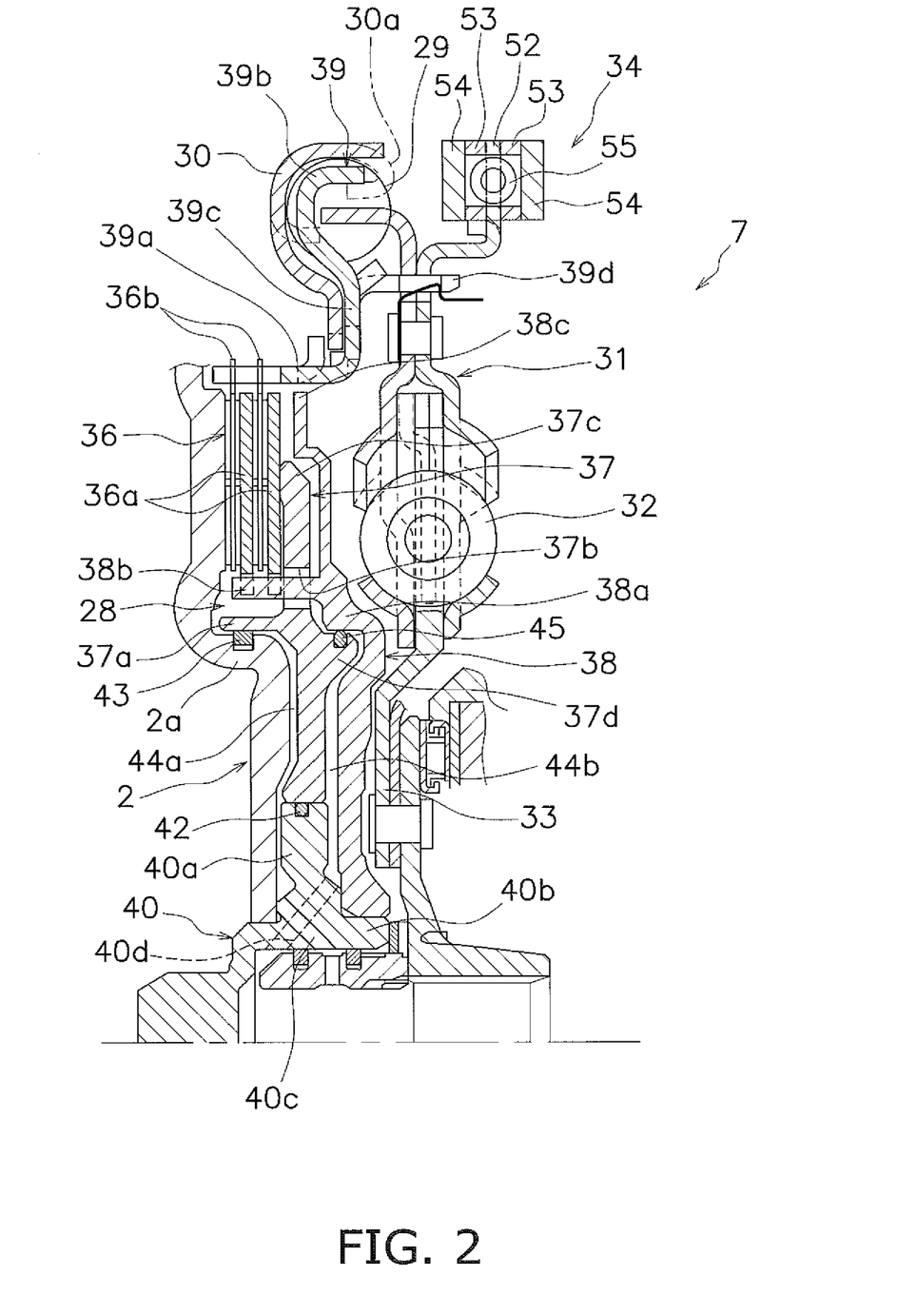
FIG. 2 is a diagram of the lock-up device extracted from FIG. 1.

FIG. 2 shows the lock-up device 7 extracted from FIG. 1. The lock-up device 7 is disposed in an annular space produced between the front cover 2 and the turbine 4. The lock-up device 7 includes a clutch portion 28, outer peripheral side torsion springs (exemplary first elastic members) 29, a float member 30, an intermediate member 31, inner peripheral side torsion springs (exemplary first elastic members) 32, a driven plate (an output rotary member) 33, and a dynamic damper device 34.

<Clutch Portion 28>

The clutch portion 28 includes a plurality of clutch plates 36, a piston 37, a hydraulic chamber forming member 38 and a drive plate 39.

-Clutch Plate 36-

The plural clutch plates 36 are disposed between the front cover 2 and the piston 37, and are composed of two first clutch plates 36a and two second clutch plates 36b. Both of the first clutch plates 36a and the second clutch plates 36b have annular shapes, and are disposed so as to be alternately aligned in the axial direction. Each first clutch plate 36a has a plurality of teeth on the inner peripheral part thereof. Each second clutch plate 36b has friction facings fixed to the both faces thereof, and has a plurality of teeth on the outer peripheral part thereof.

-Piston 37-

The piston 37 has an annular shape, and is disposed on the transmission side of the front cover 2. A clutch boss 40 is herein fixed to the inner peripheral part of the front cover 2. The clutch boss 40 has a flange 40a extending radially outward and a cylindrical part 40b axially extending to the turbine side. The inner peripheral surface of the piston 37 is axially movably supported by the outer peripheral surface of the flange 40a of the clutch boss 40. Additionally, a cylindrical part 37a is formed in the radially intermediate part of the piston 37 and protrudes toward the front cover 2. Moreover, the cylindrical part 37a is axially movably supported by a stepped part 2a of the front cover 2. A plurality of openings 37b are formed on the outer peripheral side of the cylindrical part 37a, and are circumferentially aligned at predetermined intervals.

The outer peripheral part of the piston 37 is disposed axially in opposition to the plural clutch plates 36, and serves as a pressing part 37c for pressing the plural clutch plates 36 toward the front cover 2.

-Hydraulic Chamber Forming Member 38-

The hydraulic chamber forming member 38 is disposed on the turbine side of the piston 37. The inner peripheral part of the hydraulic chamber forming member 38 is fixed to the cylindrical part 40b of the clutch boss 40. A stepped part 38a is formed in the radially intermediate part of the hydraulic chamber forming member 38, and forms a cylindrical part extending toward the front cover 2. Additionally, a plurality of protruding parts 38b are formed on the outer peripheral region of the stepped part 38a, and pass through the openings 37a of the piston 37 so as to protrude toward the front cover 2. The plural protruding parts 38b are circumferentially aligned at predetermined intervals, and are meshed with the teeth formed on the inner peripheral part of each first clutch plate 36a. Therefore, the first clutch plates 36a and the hydraulic chamber forming member 38 are non-rotatable relatively to each other and are axially movable relatively to each other.

Additionally, an extended part 38c is formed on the outer peripheral part of the hydraulic chamber forming member 38 so as to extend radially outward. The extended part 38c covers the piston 37 and the clutch plates 36 from the turbine side.

-Hydraulic Chamber-

In the construction as described above, a seal member 42 is mounted to the outer peripheral surface of the flange 40a of the clutch boss 40, whereas a seal member 43 is mounted to the stepped part 2a of the front cover 2. These members seal between the clutch boss 40 and the inner peripheral surface of the piston 37 and between the cylindrical part 37a of the piston 37 and the stepped part 2a of the front cover 2, and thereby, a first oil chamber 44a for clutch-off is formed. On the other hand, a seal member 45 is mounted to a protruding part 37d of the piston 37, which is an annular part protruding toward the turbine 4. The member seals between the piston 37 and the hydraulic chamber forming member 38, and thereby, a second oil chamber 44b for clutch-on is formed.

The clutch boss 40 has a first oil path 40c communicating with the first oil chamber 44a and a second oil path 40d communicating with the second oil chamber 44b.

-Drive Plate 39-

The drive plate 39 is disposed on the output side of the clutch portion 28. Specifically, the drive plate 39 is disposed on the outer peripheral side of the clutch plates 36. The drive plate 39 has a clutch engaging part 39a extending toward the front cover 2 and a plurality of spring engaging parts 39b.

The clutch engaging part 39a has a cylindrical shape and has axially extending grooves that are circumferentially aligned at predetermined intervals. Additionally, the grooves are engaged with the teeth formed on the outer peripheral part of each second clutch plate 36b. Therefore, the second clutch plates 36b and the drive plate 39 are non-rotatable relatively to each other and are axially movable relatively to each other.

The plural spring engaging parts 39b extend radially outward from the turbine side of the clutch engaging part 39a, and are engaged with the both end surfaces of the respective outer peripheral side torsion springs 29.

Additionally, a plurality of pawls 39d are formed on a part 39c between the clutch engaging part 39a and the spring engaging parts 39b, and extend to the turbine side.

<Outer Peripheral Side Torsion Springs 29 and Float Member 30>

The plural outer peripheral side torsion springs 29 are composed of totally eight springs that are set in pairs, for instance, and the float member 30 is mounted such that two outer peripheral side torsion springs 29 of each pair act in series.

The float member 30 is an annular member having a C-shaped cross section, and is disposed on the outer peripheral side of the clutch engaging part 39a of the drive plate 39. The float member 30 is disposed so as to be rotatable relatively to the drive plate 39, supports the outer peripheral parts of the outer peripheral side torsion springs 29 by the outer peripheral part thereof, and supports the engine-side lateral parts of the outer peripheral side torsion springs 29 by the lateral part thereof. Put differently, the float member 30 restricts the outer peripheral side torsion springs 29 from jumping out to the outer peripheral side and the lateral side. The axial transmission-side tip of the float member 30 is bent to the inner peripheral side and the engine side, and is formed as bent parts 30a, each of which is inserted between the outer peripheral side torsion springs 29 of each pair. In other words, each bent part 30a is contacted at its both circumferential end surfaces to the end surfaces of its corresponding outer peripheral side torsion springs 29.

As described above, the both circumferential ends of each pair of the outer peripheral side torsion springs 29 disposed so as to act in series are engaged with the spring engaging part 39b of the drive plate 39, and each bent part 30a of the float member 30 is inserted into the middle of the outer peripheral side torsion springs 29 of each pair. Additionally, the outer peripheral parts of the outer peripheral side torsion springs 29 are supported by the outer peripheral part of the float member 30.

<Intermediate Member 31>

Figure 3:
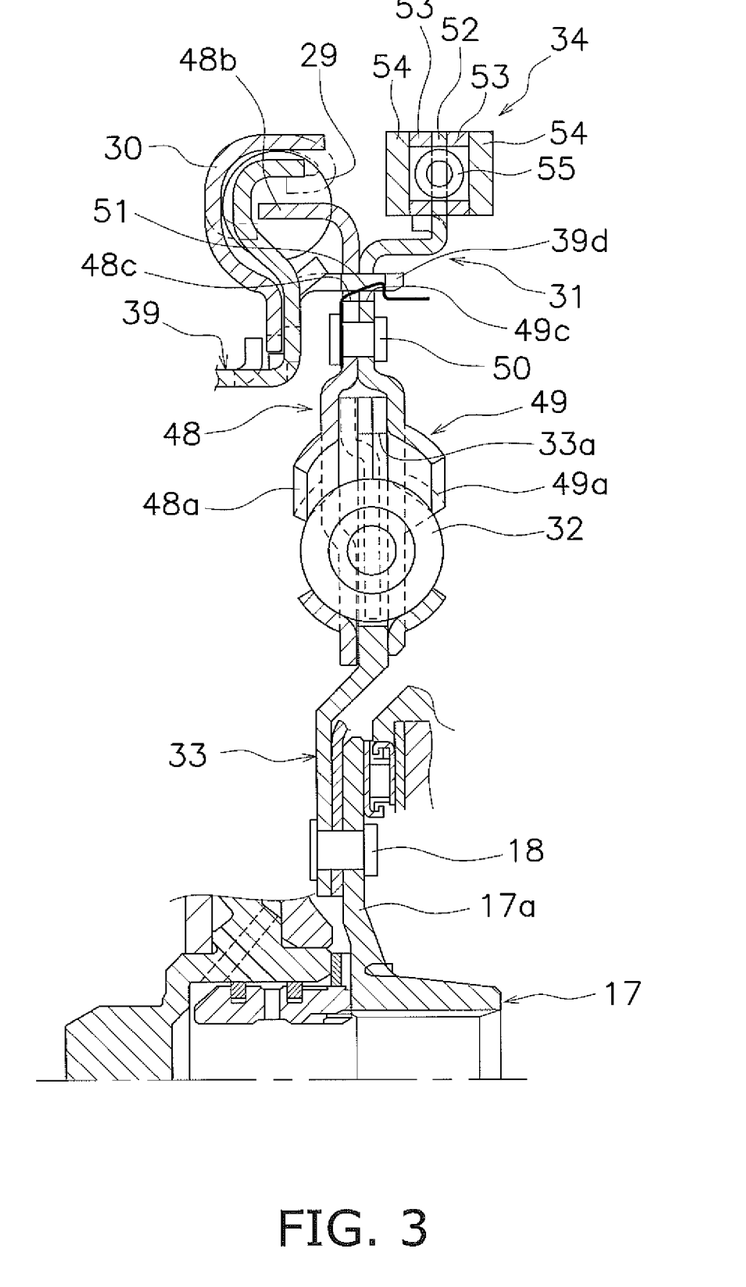
FIG. 3 is a diagram of an intermediate member and a dynamic damper device that are extracted from FIG. 1.

FIG. 3 is a diagram showing the intermediate member 31 and the dynamic damper device 34 extracted from FIG. 1. As shown in FIG. 3, the intermediate member 31 is composed of a first plate 48 and a second plate 49, and is rotatable relatively to the drive plate 39 and the driven plate 33. The first and second plates 48 and 49 are annular disc-shaped members disposed between the clutch portion 28 and the turbine shell 15. The first plate 48 and the second plate 49 are axially disposed at an interval. The first plate 48 is disposed on the engine side, whereas the second plate 49 is disposed on the transmission side. The first plate 48 and the second plate 49 are coupled at the outer peripheral parts thereof by a plurality of rivets 50 so as to be non-rotatable relatively to each other and be axially immovable. Each of the first and second plates 48 and 49 has window parts 48a, 49a axially penetrating therethrough. Each window part 48a, 49a has a circumferentially extending shape, and has cut-and-raised parts that are formed on the inner and outer peripheral parts thereof so as to be axially cut and raised.

Additionally, a plurality of locking parts 48b are formed on the outer peripheral end of the first plate 48 and extend to the outer peripheral side torsion springs 29. The plural locking parts 48b are formed by bending the tip of the first plate 48 to the axial engine side. The plural locking parts 48b are circumferentially disposed at predetermined intervals, and each pair of the outer peripheral side torsion springs 29 configured to act in series is disposed between two locking parts 48b.

The intermediate member 31 as described above enables the outer peripheral side torsion springs 29 and the inner peripheral side torsion springs 32 to act in a series-like manner.

It should be noted that holes 48c, 49c are respectively formed in the outer peripheral part of each of the first and second plates 48 and 49 so as to axially penetrate therethrough. Additionally, the pawls 39d of the drive plate 39 are inserted into the holes 48c and 49c. Each pawl 39d has a hole radially penetrating therethrough, and a flat spring 51, fixed at one end thereof to each rivet 50, is partially engaged with the hole of each pawl 39d.

With the aforementioned construction, the drive plate 39, the outer peripheral side torsion springs 29 supported by the drive plate 39, and the float member 30 are restricted from moving in the axial direction.

<Inner Peripheral Side Torsion Springs 32>

Each of the plural inner peripheral side torsion springs 32 is made in a combination of a large coil spring and a small coil spring that is inserted into the interior of the large coil spring and has the same spring length as the large coil spring. Each inner peripheral side torsion spring 32 is disposed within each pair of the window parts 48a and 49a of the both plates 48 and 49 composing the intermediate member 31. Additionally, the both circumferential ends and the both radial sides of each inner peripheral side torsion spring 32 are supported by each pair of the window parts 48a and 49a. Furthermore, each inner peripheral side torsion spring 32 is restricted from axially jumping out by the cut-and-raised parts of the window parts 48a and 49a of each pair.

<Driven Plate 33>

The driven plate 33 is an annular disc-shaped member, and the inner peripheral part thereof is fixed together with the turbine shell 15 to the flange 17a of the turbine hub 17 by the rivets 18. The driven plate 33 is disposed between the first plate 48 and the second plate 49 so as to be rotatable relatively to the both plates 48 and 49. Additionally, window holes 33a are bored in the outer peripheral part of the driven plate 33 so as to be disposed in correspondence with the window parts 48a and 49a of the first and second plates 48 and 49. The window holes 33a are axially penetrating holes, and the inner peripheral side torsion springs 32 are disposed therein.

<Dynamic Damper Device 34>

Figure 4:
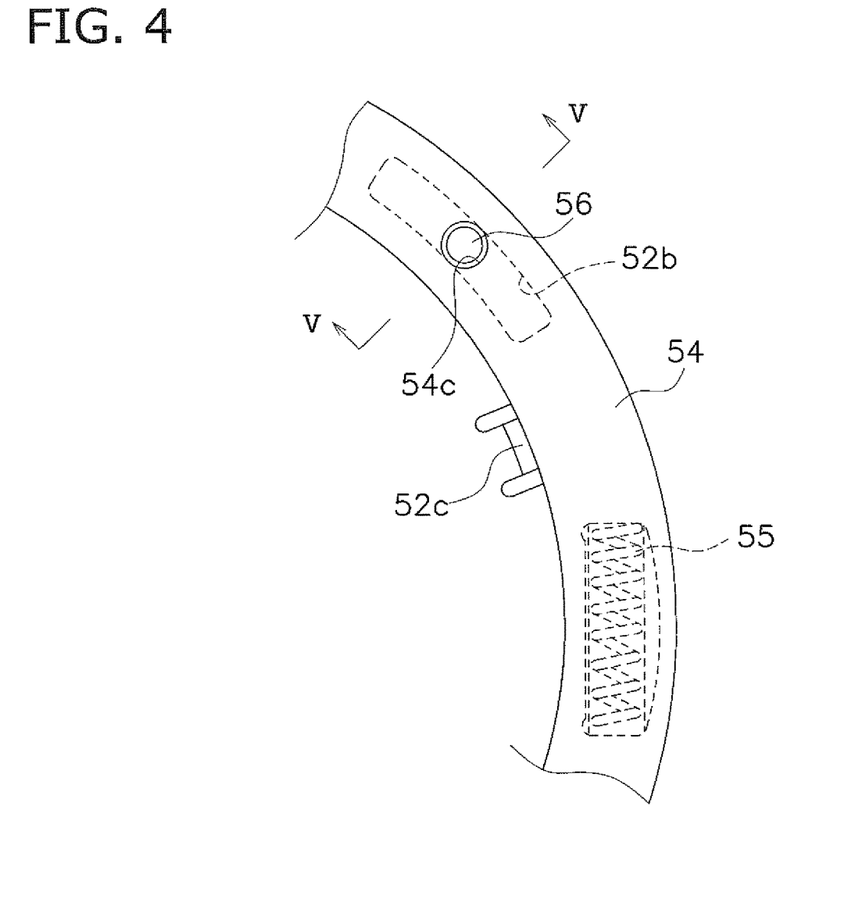
FIG. 4 is a partial front view of the dynamic damper device.
Figure 5:
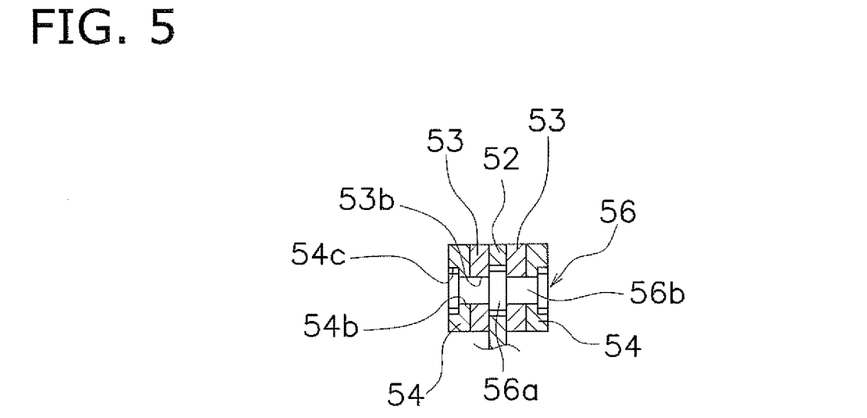
FIG. 5 is a cross-sectional view taken along line V-V in FIG. 4.

As shown in FIGS. 3, 4 and 5, the dynamic damper device 34 includes a damper plate 52 as the outer peripheral extended part of the second plate 49 composing the intermediate member 31, a pair of inertia rings 53, a pair of lid members 54, a plurality of coil springs (second elastic members) 55, and stop pins 56. It should be noted that FIG. 4 is a partial view of the dynamic damper device 34 seen from the front cover 2 side. On the ether hand, FIG. 5 is a cross-sectional view taken along line V-V in FIG. 4.

Figure 6:
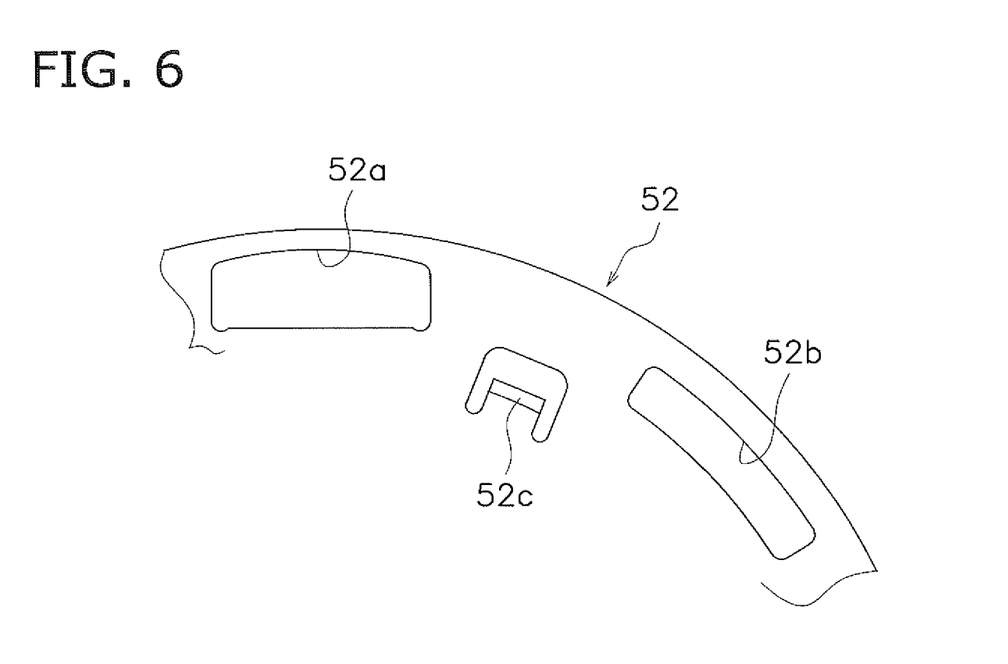
FIG. 6 is a partial front view of a damper plate of the dynamic damper device.

As described above, the damper plate 52 is a part formed by extending the outer periphery of the second plate 49 composing the intermediate member 31, and as shown in FIG. 6, has a plurality of spring accommodating parts (first openings) 52a that are circumferentially aligned at predetermined intervals. Each spring accommodating part 52a is bored with a predetermined length in the circumferential direction. A plurality of elongated holes 52b are bored circumferentially among the plural spring accommodating parts 52a. The elongated holes 52b respectively have a predetermined circumferential length and are aligned on a common circle with the spring accommodating parts 52a. Additionally, each of a plurality of spigot parts 52c is formed circumferentially between each spring accommodating part 52a and each elongated hole 52b. Each spigot part 52c is formed by partially cutting and raising the damper plate 52 toward the front cover 2.

Figure 7:
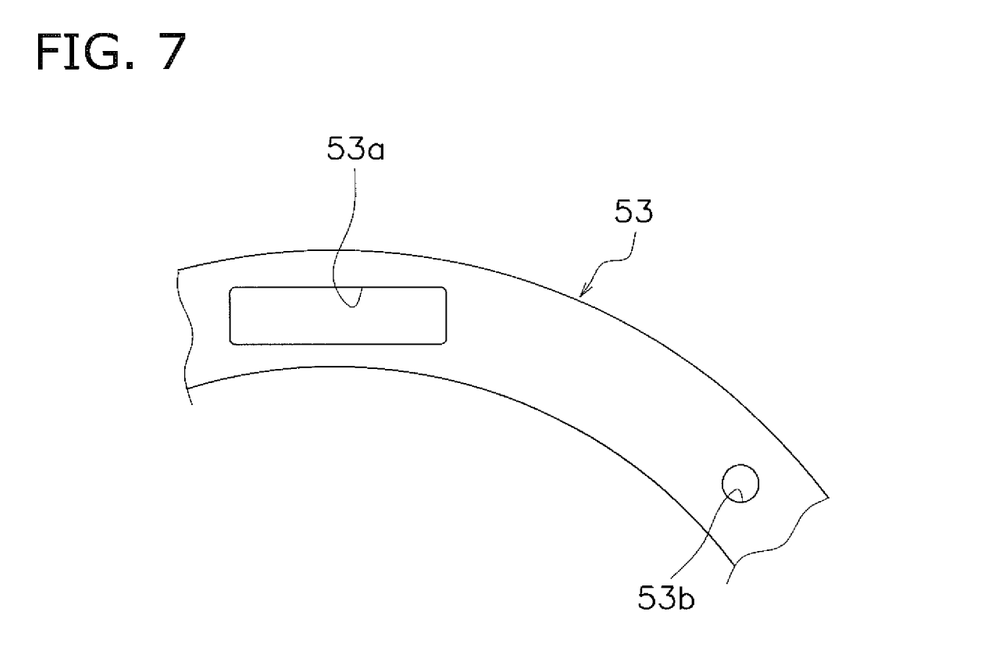
FIG. 7 is a partial front view of an inertia ring of the dynamic damper device.

The pair of inertia rings 53 is formed by stamping of sheet metal members, and is disposed axially on the both sides of the damper plate 52. The two inertia rings 53 are similarly constructed. As shown in FIG. 7, each inertia ring 53 has a plurality of spring accommodating parts (second openings) 53a that are circumferentially aligned at predetermined intervals. The spring accommodating parts 53a are bored in corresponding positions to the spring accommodating parts 52a of the damper plate 52. Additionally, each inertia ring 53 has through holes 53b, each of which is bored in a corresponding position to the circumferential middle position in each elongated hole 52b of the damper plate 52.

The pair of lid members 54 is disposed axially outside the pair of inertia rings 53. Specifically, one lid member 54 is disposed on the further front cover 2 side of one inertia ring 53 disposed on the front cover 2 side, whereas the other lid member 54 is disposed on the further turbine 4 side of the other inertia ring 53 disposed on the turbine 4 side.

As shown in FIG. 4, each lid member 54 has an annular shape, and the inner and outer diameters thereof are equal to those of each inertia ring 53. Additionally, each lid member 54 has through holes 54b that are bored in corresponding positions to the through holes 53b of each inertia ring 53.

Moreover, a recess is formed on the axially outside end of each through hole 54b, and has a larger diameter than each through hole 54b.

Each of the plural coil springs 55 is accommodated in each spring accommodating part 52a of the damper plate 52 and each spring accommodating part 53a of each inertia ring 53. Additionally, the both ends of each coil spring 55 are contacted to the circumferential ends of each spring accommodating part 52a of the damper plate 52 and those of each spring accommodating part 53a of each inertia ring 53.

As shown in FIG. 5, each stop pin 56 has a large diameter trunk 56a in the axially middle part thereof, and has small diameter trunks 56b on the both axial sides of the large diameter trunk 56a.

The diameter of the large diameter trunk 56a is larger than that of each through hole 53b of each inertia ring 53, and is smaller than that (radial dimension) of each elongated hole 52b of the damper plate 52. Additionally, the large diameter trunk 56a has a slightly larger thickness than the damper plate 52.

Each small diameter trunk 56b is inserted through each through hole 53b of one of the inertia rings 53 and each through hole 54b of one of the lid members 54. Then, the head of each small diameter trunk 56b is swaged, and thereby, the inertia rings 53 and the lid members 54 are fixed to the both axial sides of the damper plate 52.

With the construction as described above, the damper plate 52 and both of the inertia rings 53 and the lid members 54 are rotatable relatively to each other within a range that each stop pin 56 is movable within each elongated hole 52b of the damper plate 52. Then, relative rotation of the both is prevented when the large diameter trunk 56a of each stop pin 56 is contacted to one end of each elongated hole 52b.

Moreover, the inertia rings 53 and the lid members 54 are fixed by the stop pins 56, and under the condition, the inner peripheral surface of one of the inertia rings 53 is contacted to the outer peripheral surfaces of the spigot parts 52c of the damper plate 52. Accordingly, the inertia rings 53, the lid members 54 and the coil springs 55 are radially positioned.

[Action]

First, an action of the torque converter body will be briefly explained. During rotation of the front cover 2 and the impeller 3, the operating oil flows from the impeller 3 to the turbine 4, and a torque is transmitted from the impeller 3 to the turbine 4 through the operating oil. The torque, transmitted to the turbine 4, is transmitted to the input shaft (not shown in the drawings) of the transmission through the turbine hub 17.

When the speed ratio of the torque converter 1 increases and the rotational speed of the input shaft reaches a predetermined speed, the operating oil in the first oil chamber 44a is drained through the first oil path 40c, whereas the operating oil is supplied to the second oil chamber 44b through the second oil path 40d. Accordingly, the piston 37 is moved toward the front cover 2. As a result, the pressing part 37c of the piston 37 presses the clutch plates 36 toward the front cover 2, and the clutch portion 28 is turned into a clutch-on state.

In the clutch-on state as described above, the torque is transmitted through a path composed of the clutch plates 36, the drive plate 39, the outer peripheral side torsion springs 29, the intermediate member 31, the inner peripheral side torsion springs 32 and the driven plate 33 in this order, and is then outputted to the turbine hub 17.

In the lockup device 7, the torque is transmitted, and also, variation in torque inputted thereto from the front cover 2 is absorbed and attenuated. Specifically, when torsional vibration occurs in the lock-up device 7, the outer peripheral side torsion springs 29 and the inner peripheral side torsion springs 32 are compressed in series between the drive plate 39 and the driven plate 33. Furthermore, similarly regarding the outer peripheral side torsion springs 29, the outer peripheral side torsion springs 29 of each pair are compressed in series. Due to this, a torsion angle can be widened. Additionally, in particular, the outer peripheral side torsion springs 29, each of which can be circumferentially laid at a long distance, are configured to act in series. Hence, the torsion angle can be reliably widened as much as possible. This means that stiffness can be lowered as much as possible in torsional characteristics, and vibration absorption and attenuation performance can be enhanced as much as possible.

[Action of Dynamic Damper Device]

The torque transmitted to the intermediate member 31 is transmitted to the driven plate 33 through the inner outer peripheral side torsion springs 32, and is further transmitted to a transmission-side member through the turbine hub 17. At this time, the dynamic damper device 34 is mounted to the intermediate member 31. Hence, variation in rotational speed of the engine can be effectively inhibited. Put differently, the rotation of the damper plate 52 and that of the inertia rings 53 and the lid members 54 are displaced in phase by the action of the coil springs 55. Specifically, the rotation of the inertia rings 53 and the lid members 54 delays with respect to that of the damper plate 52. Variation in rotational speed can be absorbed by the phase displacement.

Figure 8:
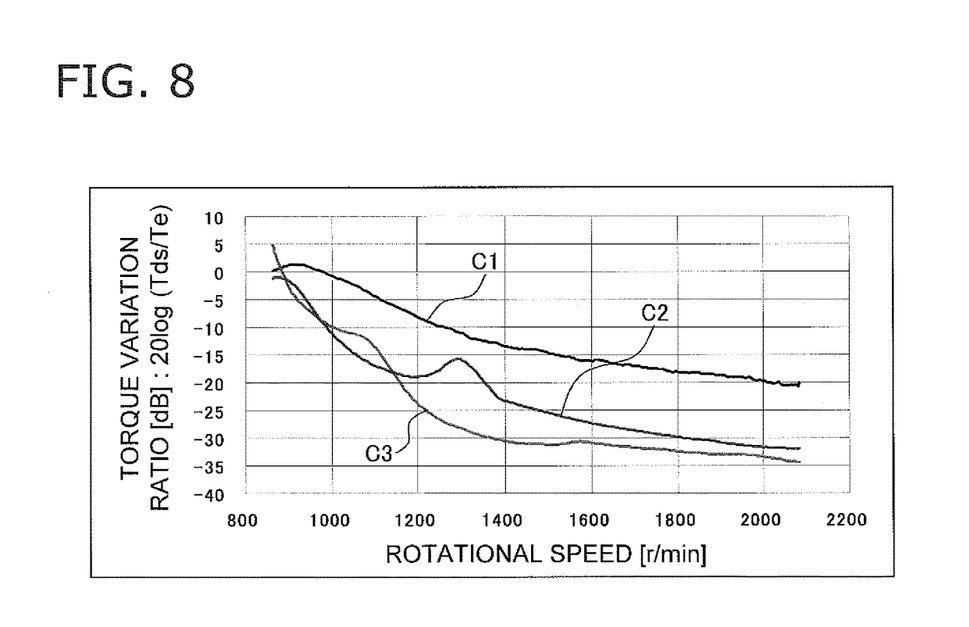
FIG. 8 is a characteristic diagram of engine rotational speed and variation in rotational speed.

Additionally, in the present exemplary embodiment, the dynamic damper device 34 is fixed to the intermediate member 31, and the inner peripheral side torsion springs 32 for inhibiting vibration are disposed between the dynamic damper device 34 and the turbine hub 17. As shown in FIG. 8, variation in rotational speed can be more effectively inhibited by the action of the inner peripheral side torsion springs 32. In FIG. 8, a characteristic C1 indicates variation in rotational speed in a well-known lock-up device. A characteristic C2 indicates variation in rotational speed to be caused when the dynamic damper device is mounted to the turbine hub and no elastic member (torsion spring) is mounted on the output side of the dynamic damper device. On the other hand, a characteristic C3 indicates variation in rotational speed to be caused when, as with the present exemplary embodiment, the dynamic damper device is mounted to the intermediate member and the elastic members (the inner peripheral side torsion springs 32) are mounted on the output side of the dynamic damper device.

As is obvious from comparison between the characteristics C2 and C3 in FIG. 8, when the elastic members are mounted on the output side of the dynamic damper device, the peak of variation in rotational speed is lowered, and variation in rotational speed can be also inhibited even in a normal range of the engine rotational speed.

[Features]

(1) The dynamic damper device 34 is constructed by disposing the pair of the inertia rings 53 on the both sides of the damper plate 52. Hence, the pair of the inertia rings 53 can be formed by plate members. Consequently, manufacturing cost can be reduced lower than inertia rings produced as casting products or forging products.

(2) The lid members 54 prevent the coil springs 55 from jumping out of the spring accommodating parts 53*a* of the inertia rings 53. Therefore, the inertia rings 53 are not required to be provided with protrusions or so forth for restricting the coil springs 55 from jumping out. Additionally, the lid members 54 can be utilized to exert a function of inertia.

(3) The coil springs 55 are accommodated in the interior of the damper plate 52 and the inertia rings 53. Hence, in particular, the axial space occupied by the dynamic damper device can be compacted.

(4) The inertia rings 53 are axially split. Hence, the damper plate 52 can be easily inserted therein, and the coil springs 55 can be easily assembled thereto.

(5) The dynamic damper device 34 is mounted to the intermediate member 31, and the inner peripheral side torsion springs 32 are mounted on the output side of the dynamic damper device 34. Hence, variation in rotational speed can be inhibited as effectively as possible.

(6) The damper plate 52 is provided with the spigot parts 52*c*, and thereby, the inertia rings 53 and the lid members 54 are radially positioned. Therefore, the dynamic damper device 34 can be radially positioned with a simple construction.

[Other Exemplary Embodiments]

The present invention is not limited to the exemplary embodiment as described above, and a variety of changes or modifications can be made without departing from the scope of the present invention.

(a) in the aforementioned exemplary embodiment, the pair of inertia rings is constructed to have the same shape, but may be constricted to have different shapes.

(b) In the aforementioned exemplary embodiment, the damper plate is formed in the outer peripheral part of the second plate composing the intermediate member. However, the damper plate maybe provided as a separate member.

Figure 9:
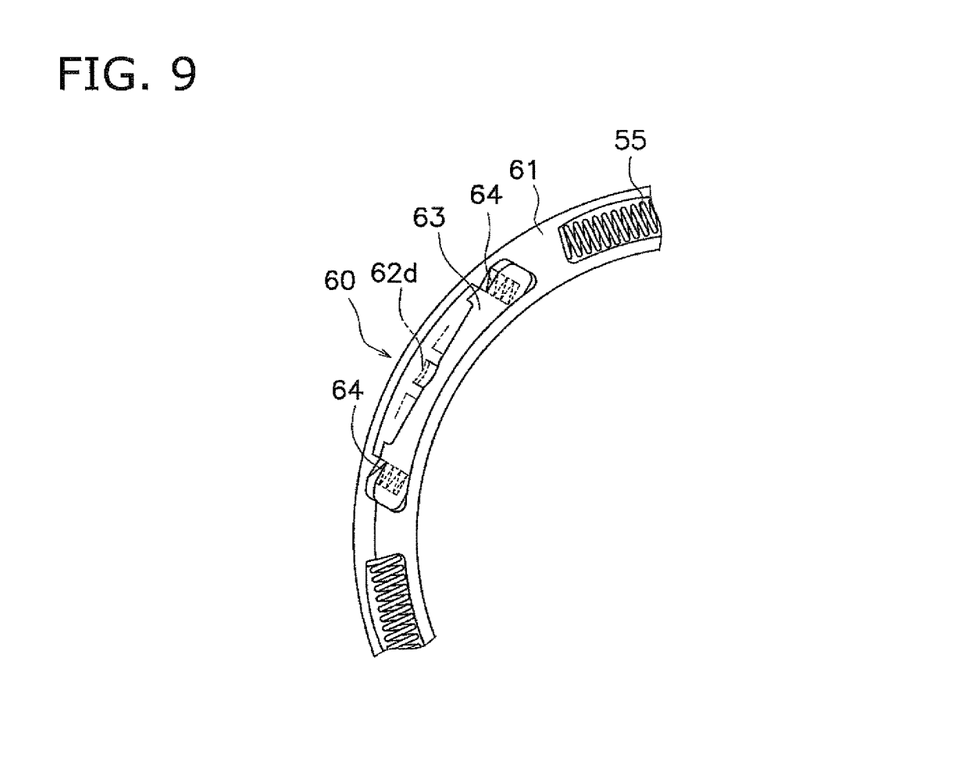
FIG. 9 is a partial front view of a hysteresis torque generating mechanism according to another exemplary embodiment of the present invention.

(c) The dynamic damper device of the aforementioned exemplary embodiment may be provided with a hysteresis torque generating mechanism. FIG. 9 shows a hysteresis torque generating mechanism 60. Here, one (or both) of a pair of inertia rings 61 is constructed to be thicker than each of the inertia rings in the aforementioned exemplary Additionally, the hysteresis torque generating mechanism 60 is assembled to the aforementioned one of the inertia rings 61.

[Construction of Hysteresis Torque Generating Mechanism 60]

The hysteresis torque generating mechanism 60 is a mechanism configured to generate a variable hysteresis torque between a damper plate 62 (see FIG. 10) and the aforementioned one of the inertia rings 61. The hysteresis torque generating mechanism 60 includes pawls 62*d* of the damper plate 62 as shown in FIG. 10, sliders 63 and springs 64.

Figure 10:
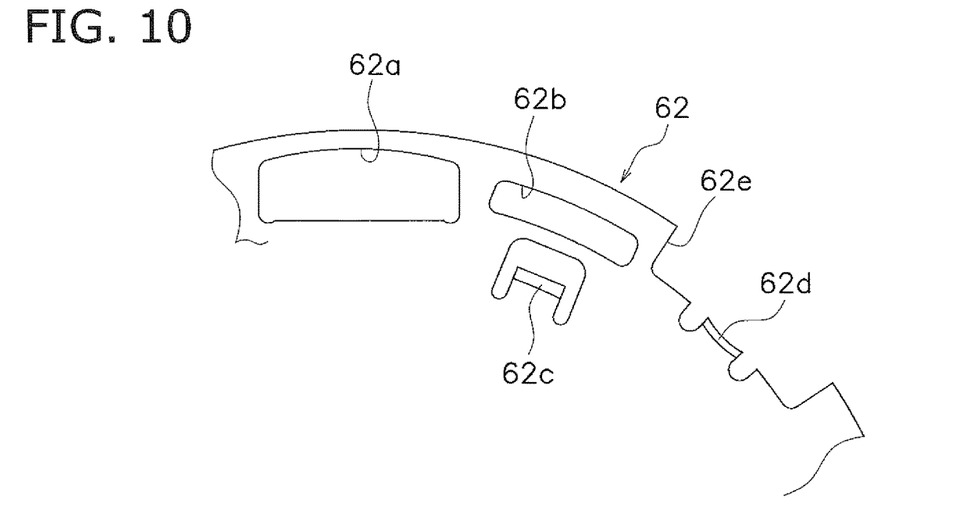
FIG. 10 is a partial front view of a damper plate according to another exemplary embodiment.

As shown in FIG. 10, similarly to the aforementioned damper plate, the damper plate 62 is a part formed by extending the outer periphery of the second plate composing the intermediate member, but may be formed as a separate member. Excluding the pawls 62*d* formed in the damper plate 62, the basic construction of the damper plate 62 is similar to that of the damper plate in the aforementioned exemplary embodiment. Put differently, the damper plate 62 has spring accommodating parts 62*a*, elongated holes 62*b*, and spigot parts 62*c*, and the functions of these elements are respectively similar to those of the corresponding elements in the aforementioned exemplary embodiment.

In the present exemplary embodiment, the damper plate 62 has the pawls 62*d* in addition to the aforementioned constituent elements. Specifically, the damper plate 62 has a plurality of cutout parts 62*e*, each of which is formed in a predetermined angular range of the outer peripheral part thereof. Each pawl 62*d* is formed by bending the circumferential middle part of the inner peripheral edge of each cutout 62e toward the aforementioned one of the inertia rings 61.

Figure 11:
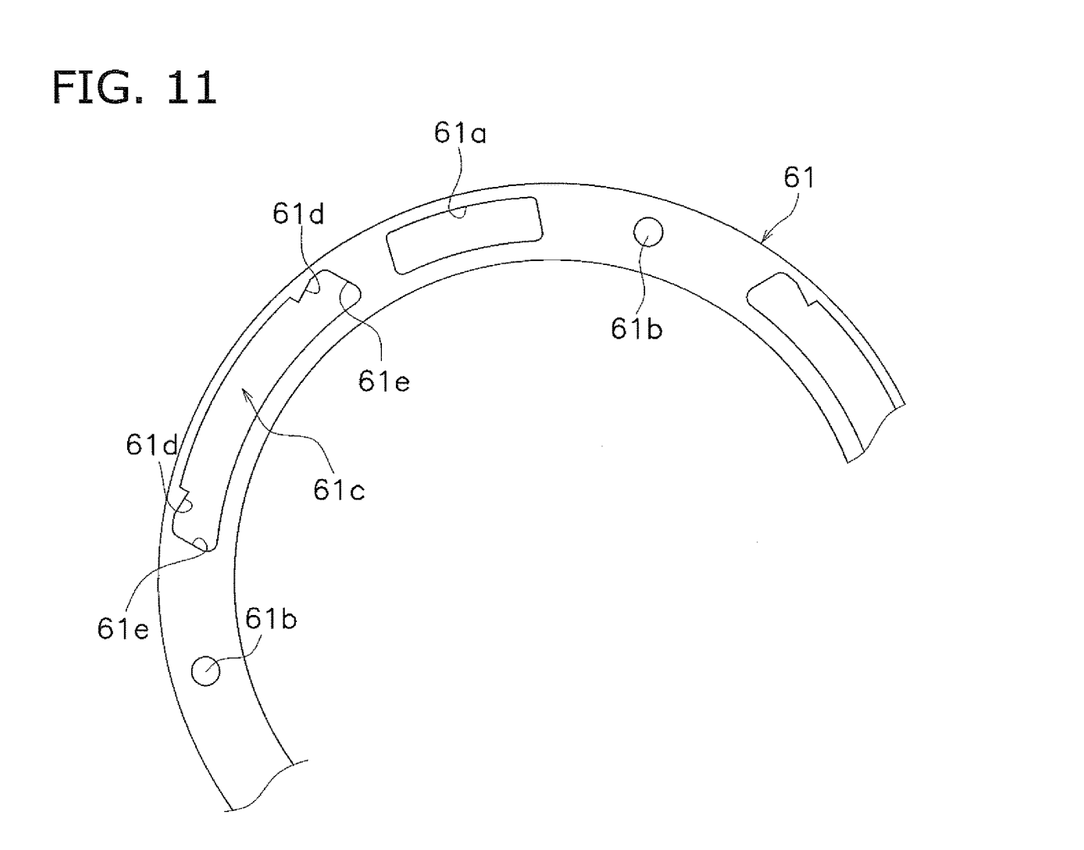
FIG. 11 is a partial front view of an inertia ring according to another exemplary embodiment.

As shown in FIG. 11, each inertia ring 61 is an annular member and is disposed so as to be rotatable relatively to the damper plate 62. Each inertia ring 61 has a plurality of spring accommodating parts 61a, a plurality of through holes 61b through which stop pins are inserted, and a plurality of slider accommodating parts 61c at predetermined intervals in the circumferential direction.

The plural coil springs 55 are accommodated in the spring accommodating parts 62a of the damper plate 62 and the spring accommodating parts 61a of the inertia rings 61. The damper plate 62 and the inertia rings 61 are elastically coupled in the rotational direction by the coil springs 55.

Figure 12:
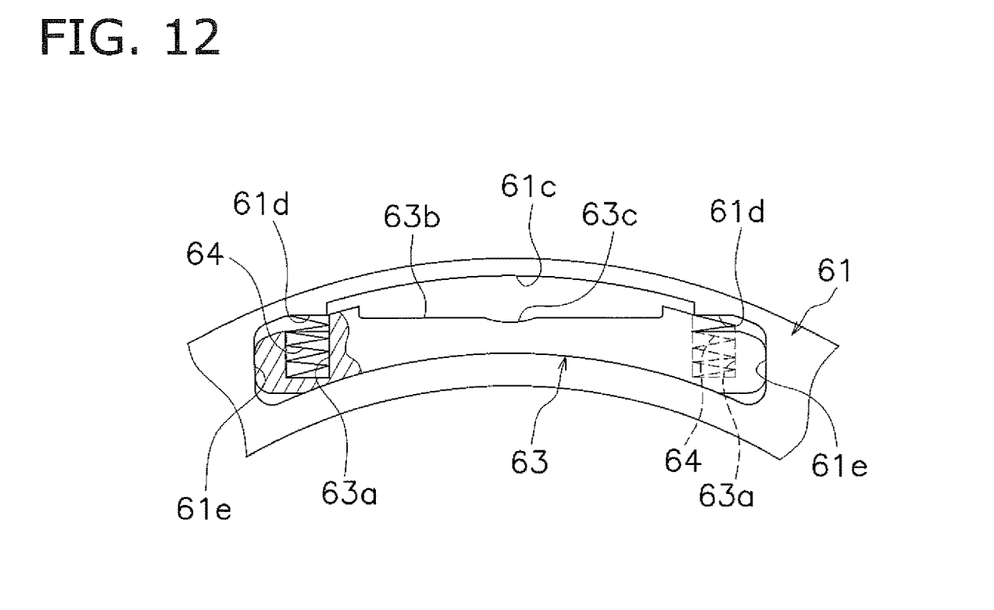
FIG. 12 is a diagram showing a slider of the hysteresis torque generating mechanism.

As shown in FIG. 9, each slider 63 is a circumferentially elongated member and is accommodated in each slider accommodating part 61c of the aforementioned one of the inertia rings 61 so as to be radially movable. FIG. 12 shows each slider accommodating part 61c of the aforementioned one of the inertia rings 61 and each slider 63, both of which are extracted from the entire construction.

Each slider accommodating part 61c has spring receiving parts 61d on the both circumferential ends thereof. Additionally, the both circumferential end walls of each slider accommodating part 61c function as guide parts 61e.

On the other hand, each slider 63 has spring accommodating parts 63a that are formed radially inward in the both circumferential ends thereof. Additionally, a spring 64 is accommodated in each spring accommodating part 63a in order to urge each slider 63 to the inner peripheral side. The both lengthwise ends of each slider 63 make contact with the guide parts 61e of each slider accommodating part 61c. Moreover, an outer peripheral surface 63b of each slider 63 curves so as to be recessed inward. Furthermore, a lock part 63c, to which each pawl 62d of the damper plate 62 is fitted, is formed on the circumferential middle part of the outer peripheral surface 63b.

[Inhibition of Variation in Rotational Speed]

As explained with FIG. 8, variation in rotational speed is inhibited by the dynamic damper device similarly to the aforementioned exemplary embodiment. In the present exemplary embodiment, variation in rotational speed can be more effectively inhibited by the hysteresis torque generating mechanism 60 herein provided. This will be hereinafter explained.

Figure 13:
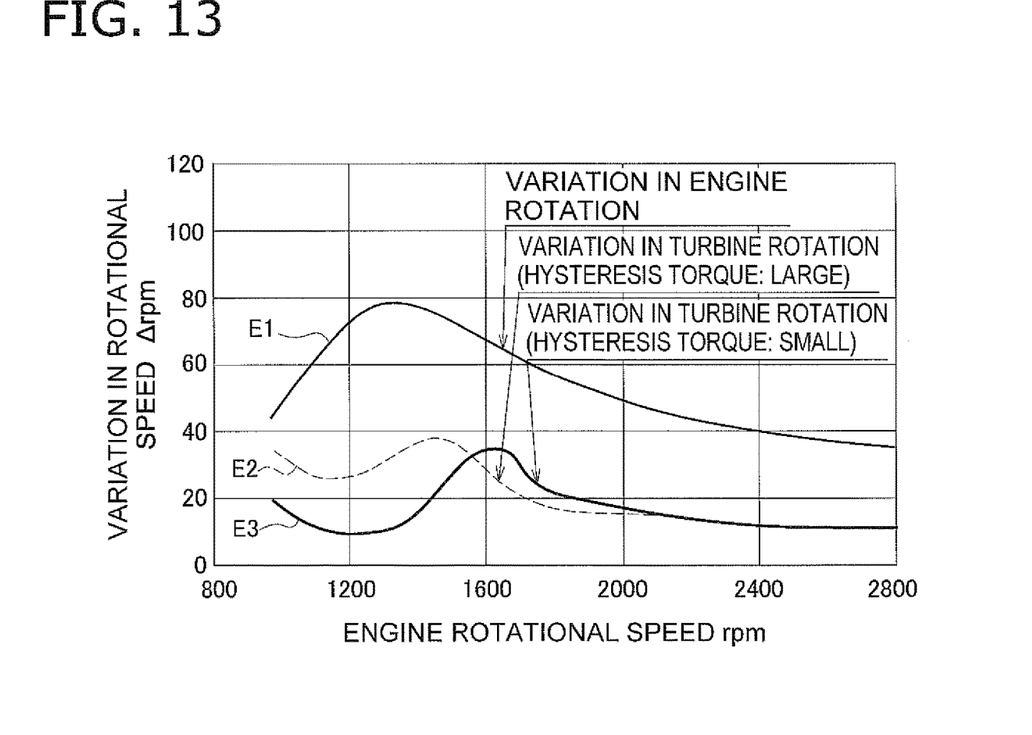
FIG. 13 is a characteristic diagram of engine rotational speed and variation in rotational speed.

As shown in FIG. 13, with respect to variation in rotational speed of the engine (E1), variation in rotational speed of the turbine exerts characteristics as depicted with curves E2 and E3 in accordance with the magnitude of hysteresis torque generated in the hysteresis torque generating mechanism 60. It should be noted that the characteristics E2 and E3 are both exerted when the dynamic damper device is provided.

The characteristic E2 corresponds to a condition that the magnitude of hysteresis torque is relatively large, whereas the characteristic E3 corresponds to a condition that the magnitude of hysteresis torque is relatively small. In the characteristic E2, variation in rotational speed of the turbine decreases when the engine is rotated at around a rotational speed lower than 1200 rpm, is then maximized at around 1500 rpm, and gradually decreases in a rotational speed range higher than around 1500 rpm. On the other hand, in the characteristic E3, variation in rotational speed of the turbine indicates the minimum value smaller than that of the characteristic E2 around when the engine rotational speed exceeds 1200 rpm, and then, exceeds variation in rotational speed in the characteristic E2 and indicates the maximum value when the engine rotational speed is around 1600 rpm.

As is obvious from these characteristics, in a low rotational speed range of the engine rotational speed, variation in rotational speed of the turbine is smaller the magnitude of hysteresis torque is smaller, whereas in a middle rotational speed range, variation in rotational speed of the turbine is smaller when the magnitude of hysteresis torque is larger. On the other hand, in a high rotational speed range, variation in rotational speed of the turbine is less affected by the magnitude of the hysteresis torque.

In view of the above, the hysteresis torque generating mechanism 60 according to the present exemplary embodiment is configured to make the hysteresis torque vary depending on the rotational speed ranges. Specifically, the magnitude of hysteresis torque to be generated by the hysteresis torque generating mechanism 60 is small in the low rotational speed range of the engine rotational speed, and gradually increases in the middle and high rotational speed ranges.

[Action of Hysteresis Torque Generating Mechanism 60]

Using FIG. 14, explanation will be described for an action whereby hysteresis torque varies in accordance with the rotational speed ranges.

First, the magnitude of centrifugal force acting on the sliders 63 is relatively small in the low rotational speed range. Therefore, as shown in <Normal Condition> of FIG. 14(a), each slider 63 is urged to the inner peripheral side by the urging force of the springs 64. When the dynamic damper device is actuated in such a condition and the damper plate 62 and the inertia rings 61 are rotated relatively to each other, each pawl 62d of the damper plate 62 is moved relatively to each slider 63 on the outer peripheral side of the outer peripheral surface 63b of each slider 63.

At this time, each pawl 62d makes contact with the outer peripheral surface 63b of each slider 63, and thereby, the angular range of relative rotation of the damper plate 62 (torsion angle) is restricted. Furthermore, the torsion angle is maximized to θ1 in the low rotational speed range shown in FIG. 14(a). On the other hand, in a torsion angular range of ±θ1, each pawl 62d is smoothly moved outside each slider 63, and thus, the magnitude of hysteresis torque is herein small.

When the rotational speed increases, the magnitude of centrifugal force acting on the sliders 63 increases. When a large centrifugal force acts on each slider 63, each slider 63 is moved to the outer peripheral side against the urging force of the springs 64 as shown in <Attenuated Condition> of FIG. 14(b). In such condition, each pawl 62d and the outer peripheral surface 63b of each slider 63 get closer, and the range that each pawl 62d is smoothly movable (torsion angle) becomes θ2, which is narrower than that in the low rotational speed range of FIG. 14(a). Furthermore, in a torsion angular range of θ2 or greater, each pawl 62d strongly makes contact with the outer peripheral surface 63b of each slider 63, and hence, a hysteresis torque larger than that in the low rotational speed range is generated.

Figure 14:
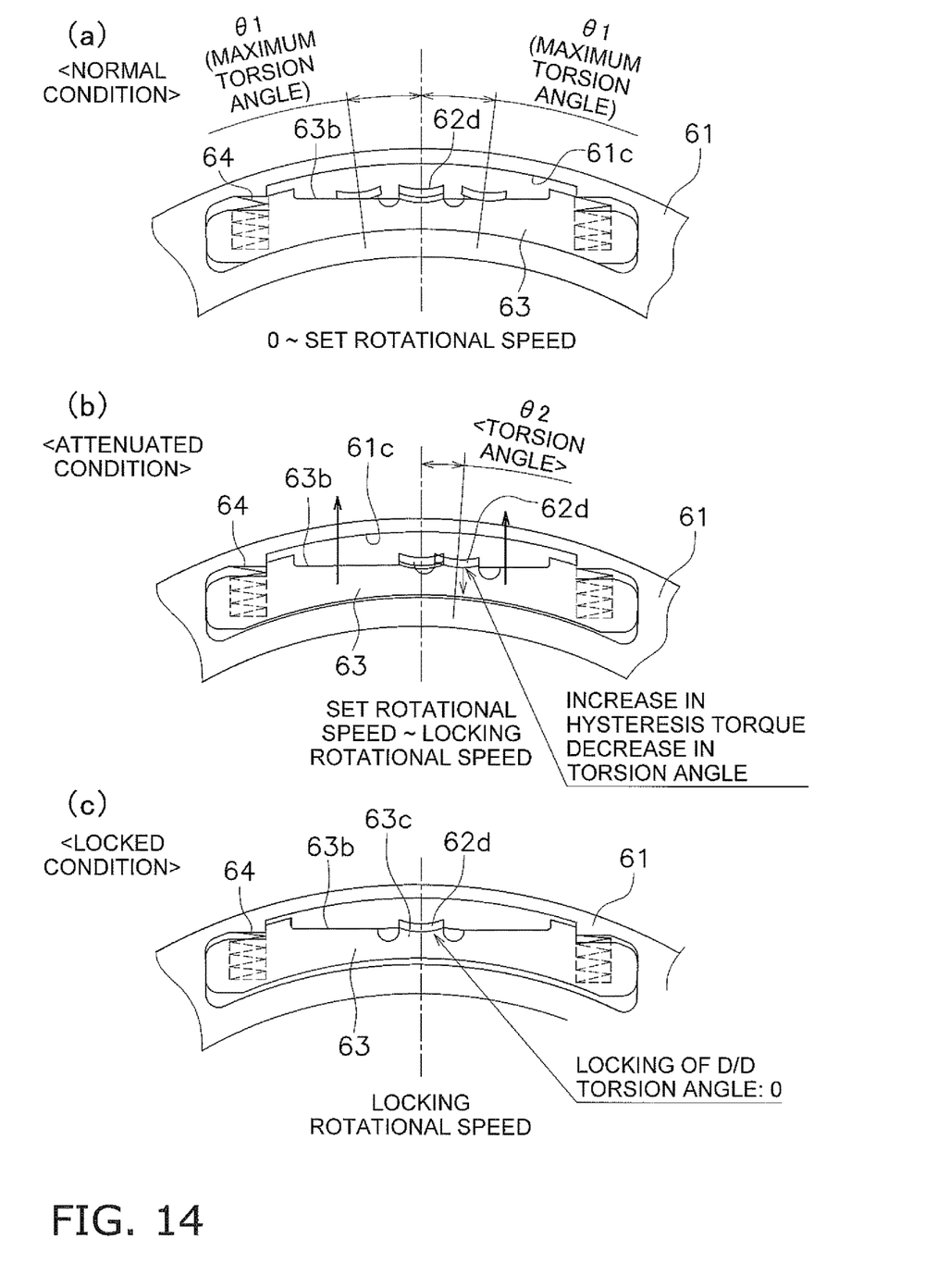
FIG. 14 includes diagrams for explaining actions of the hysteresis torque generating mechanism.

When the rotational speed then further increases, each slider 63 is moved to the further outer peripheral side against the urging force of the springs 64, and a condition as shown in <Locked Condition> of FIG. 14(c) is produced. In the condition, each pawl 62d is fitted to the lock part 63c of the outer peripheral surface 63b of each slider 63. Put differently, relative rotation between the pawls 62d (i.e., the damper plate 62) and the inertia rings 61 is prevented, and a locked condition is produced. Thus, in the condition shown in FIG. 14(c), the hysteresis torque in the dynamic damper device becomes infinite.

In the construction as described above, as shown in FIG. 13, the characteristic of variation in rotational speed of the turbine becomes the characteristic E3 in the low rotational speed range, and becomes the characteristic E2 in the middle to high rotational speed ranges. Therefore, variation in rotational speed of the turbine can be inhibited low over the entire engine rotational speed ranges.

(d) In the aforementioned exemplary embodiment, the dynamic damper device is fixed to the intermediate member coupling the outer peripheral side torsion springs and the inner peripheral side torsion springs. However, the positional arrangement of the dynamic damper device is not limited to this.

For example, the dynamic damper device may be fixed to a float member for causing two outer peripheral side torsion springs of each pair to act in a series-like manner. Alternatively, the dynamic damper device may be similarly fixed to a member for causing two inner peripheral side torsion springs of each pair to act in a series-like manner. In either construction, occurrence of secondary resonance can be inhibited by disposing torsion springs as a damper mechanism on the output side of the dynamic damper device.

(e) The construction for coupling the dynamic damper device to the intermediate member is not limited to the construction of the aforementioned exemplary embodiment. For example, teeth or pawls may be formed on one of the intermediate member and a member composing the dynamic damper device whereas cutouts or so forth may be bored in the other of these members, and the teeth or pawls and the cutouts or so forth may be designed to be coupled to each other.

(f) In the aforementioned exemplary embodiment, the elastic members are composed of the coil springs. However, another type of elastic members made of resin or so forth may be used instead.

INDUSTRIAL APPLICABILITY

The lock-up device of the present invention can especially realize a construction axially occupying a small space. Additionally, the inertia members can be formed by plate members, and thus, manufacturing cost thereof can be reduced lower than inertia members produced as casting products or forging products.

REFERENCE SIGNS LIST

1 Torque converter
2 Front cover
4 Turbine
6 Torque converter body
7 Lock-up device
28 Clutch portion
29 Outer peripheral side torsion spring
31 Intermediate member
32 Inner peripheral side torsion spring
33 Driven plate
34 Dynamic damper device
52, 62 Damper plate
53, 61 Inertia ring
54 Lid member
55 Coil spring
60 Hysteresis torque generating mechanism
62d Pawl
63 Slider
63c Lock part

The invention claimed is:

1. A lock-up device for a torque converter, the lock-up device disposed between a front cover coupled to an engine-side member and a torque converter body, the lock-up device configured to directly transmit a torque from the front cover to a turbine of the torque converter body, the lock-up device comprising:
a clutch portion configured to transmit the torque from the front cover to an output side;
an output rotary member coupled to the turbine, the output rotary member rotatable relatively to the clutch portion;
a plurality of first elastic members for elastically and rotation-directionally coupling the clutch portion and the output rotary member; and
a dynamic damper device coupled to a member of a power transmission path from the clutch portion to the output rotary member, the dynamic damper device configured to attenuate variation in rotational speed, wherein
the dynamic damper device includes
a damper plate having a plurality of circumferentially extending first openings, the damper plate configured to be rotated together with the output rotary member,
a pair of inertia members disposed on both axial sides of the damper plate, the pair of inertia members rotatable relatively to the damper plate, each of the inertia members having circumferentially extending second openings located to oppose the first openings, and
a plurality of second elastic members accommodated in the first openings and the second openings, the second elastic members elastically coupling the damper plate and the pair of inertia members.

2. The lock-up device recited in claim 1, wherein
each of the inertia members has an annular shape, and
the damper plate has a spigot part, the spigot part contacted to one of inner peripheral surfaces of the inertia members to radially position the inertia members.

3. The lock-up device recited in claim 1, further comprising:
an intermediate member for causing at least two of the plural first elastic members to act in a series-like manner, the intermediate member rotatable relatively to the clutch portion and the output rotary member, wherein
the damper plate is coupled to the intermediate member.

4. The lock-up device recited in claim 1, further comprising:
a pair of lid members, each of the pair of lid members disposed axially outside each of the pair of inertia members to close the second openings.

5. The lock-up device recited in claim 4, wherein
the damper plate has a plurality of circumferentially extending elongated holes located circumferentially between or among the plural first openings, and
the lock-up device further comprises a plurality of coupling members, the coupling members axially passing through the elongated holes, the coupling members coupling the pair of inertia members and the pair of lid members.

6. The lock-up device recited in claim 5, wherein the first openings and the elongated holes of the damper plate are disposed on a common circle.

7. The lock-up device recited in claim 1, wherein the dynamic damper device includes a hysteresis torque generating mechanism, the hysteresis torque generating mechanism configured to generate a first hysteresis torque in a low rotational speed range and generate a second hysteresis torque larger than the first hysteresis torque in middle to high rotational speed ranges.

8. The lock-up device recited in claim 7, wherein the hysteresis torque generating mechanism includes
- a slider configured to be rotated together with the inertia members, the slider radially movable with respect to the inertia members, the slider having a rotation-directionally extending slide surface, and
- a contact member configured to be rotated together with the damper plate, the contact member configured to be contacted to the slide surface of the slider in the low rotational speed range to restrict a relative torsion angular range thereof with respect to the inertia members to a first angular range, the contact member configured to be contacted to the slide surface of the slider in the middle rotational speed range including a first rotational speed higher than a second rotational speed in the low rotational speed range to restrict the relative torsion angular range thereof with respect to the inertia members to a second angular range narrower than the first angular range, the contact member configured to be contacted to the slide surface of the slider in the high rotational speed range including a third rotational speed higher than the first rotational speed in the middle rotational speed range to prevent relative torsional rotation thereof with respect to the inertia members.

9. The lock-up device recited in claim 8, wherein the slider has a lock part on a rotation-directional middle of the slide surface thereof to enable the contact member to be fitted thereto.

* * * * *